United States Patent [19]

Saito et al.

[11] 4,272,784
[45] Jun. 9, 1981

[54] CHANNEL PROGRAMING APPARATUS

[75] Inventors: Takahiko Saito, Kamakura; Masaru Sato, Asaka, both of Japan

[73] Assignee: Sony Corporation, Tokyo, Japan

[21] Appl. No.: 973,536

[22] Filed: Dec. 26, 1978

[30] Foreign Application Priority Data

Dec. 27, 1977 [JP] Japan .......................... 52-179139[U]

[51] Int. Cl.³ .............................................. H04N 5/78
[52] U.S. Cl. ...................................... 358/127; 369/5; 369/7
[58] Field of Search ............... 358/127, 188, 191, 192; 360/33; 179/100.1 PS, 100 H; 325/395, 396; 455/344

[56] References Cited

U.S. PATENT DOCUMENTS

| | | | |
|---|---|---|---|
| 2,675,467 | 4/1954 | Gibbs | 325/396 |
| 3,829,891 | 8/1974 | Uchida | 360/33 |
| 3,949,303 | 4/1976 | Nishimura | 325/396 |
| 4,031,548 | 6/1977 | Kato et al. | 358/127 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

Channel programming apparatus is capable of supplying a first video device, such as a video display, and a second video device, such as a video recorder, each with an individually tuned video signal. The apparatus includes first and second tuner circuits providing first and second tuned signals, respectively, first and second video outputs through which the individually tuned signals are applied to the first and second video devices, a connection for applying the second tuned signal to the second video output, a tuner switching device for selectively applying one of the first and second tuned signals to the first video output, a timing device having an unset state and being changeable to a set state in which the timing device produces a timed command at a selected time, and a device for causing the tuner switching device to apply the second tuned signal to the first video output in response to the tuned command. Thus, for example, a reserved channel tuned on the second tuned circuit can be programmed to appear at the first video device at a time determined by the timing device. In a preferred embodiment a mode switching device is provided for selectively establishing a record command mode as well as a reserve command mode. In the record command mode the second video device is set to a recording mode in response to said timed command, so that a channel tuned on the second tuned circuit can be recorded at a predetermined time.

7 Claims, 3 Drawing Figures

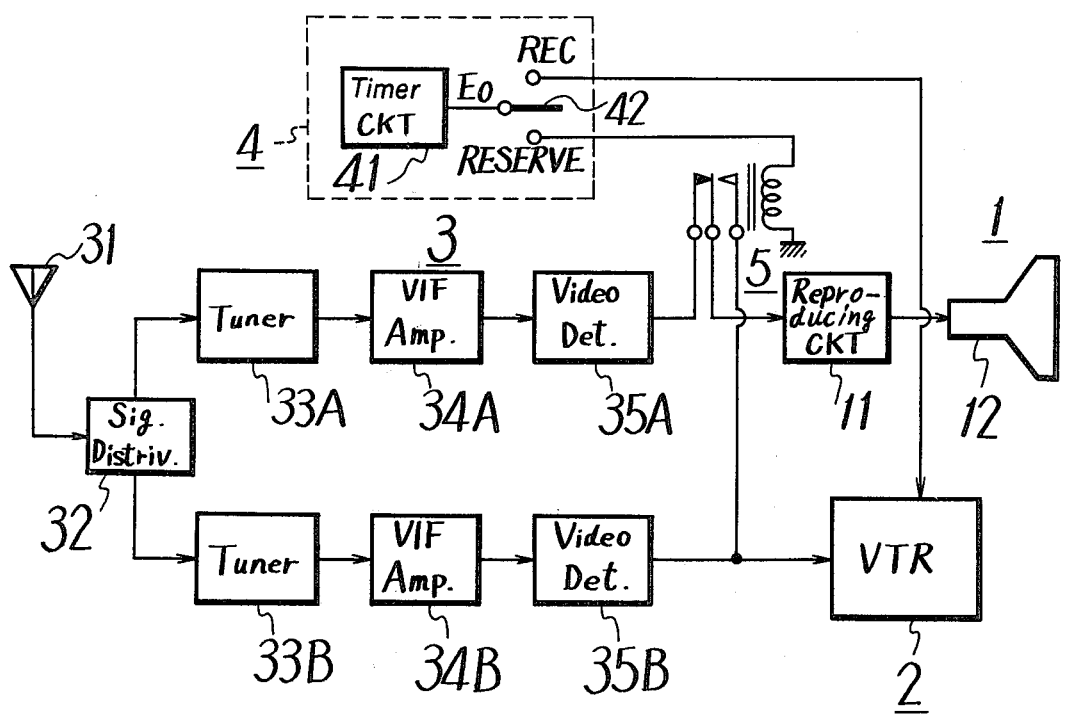
FIG. 1
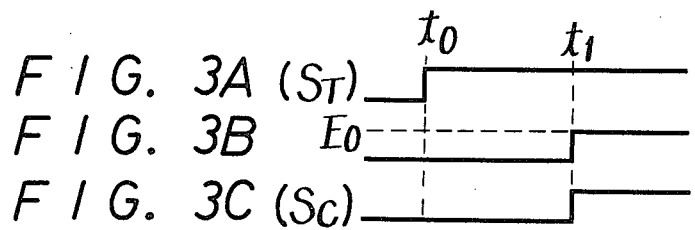
FIG. 3A ($S_T$)
FIG. 3B $E_0$
FIG. 3C ($S_C$)

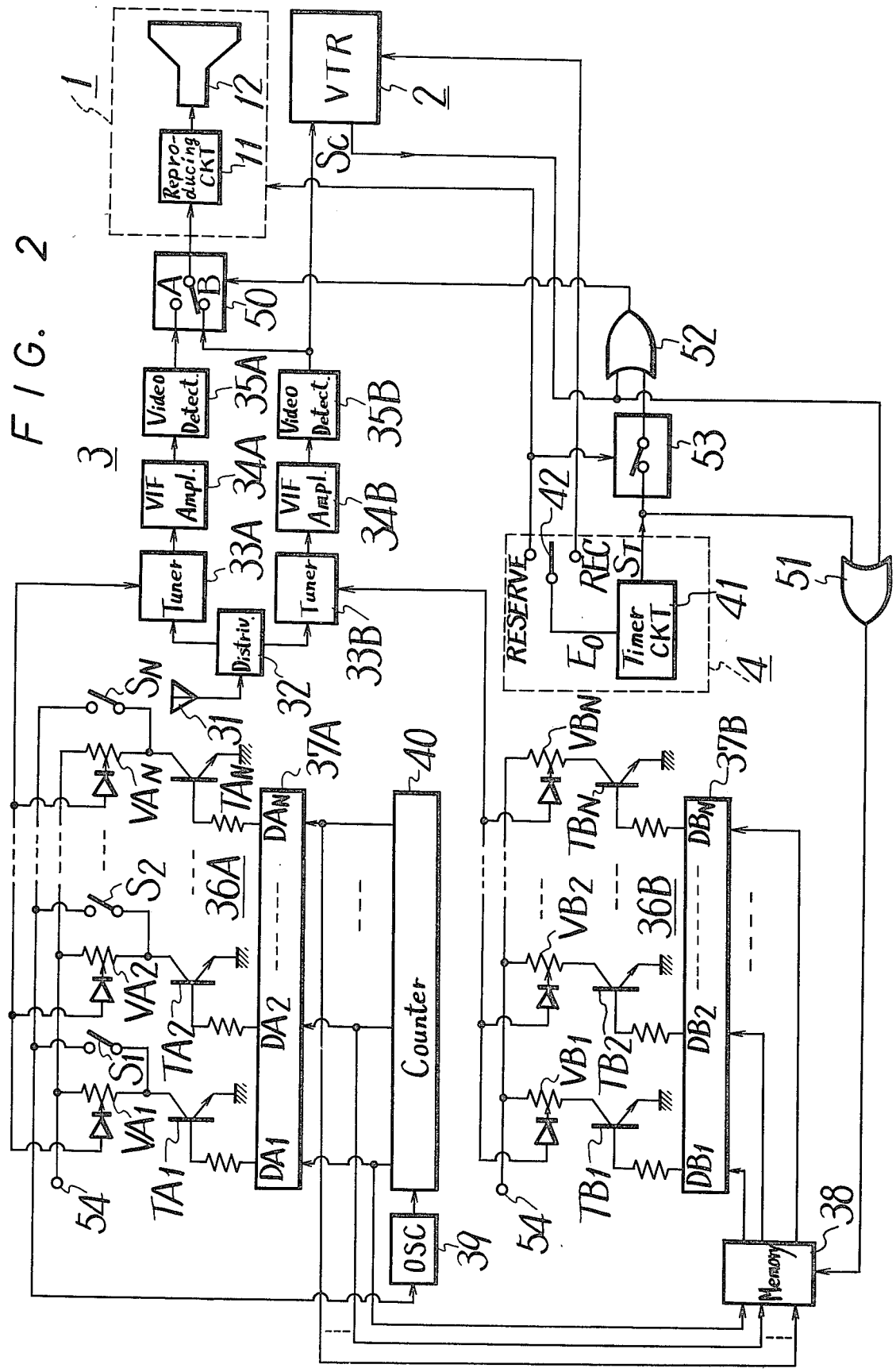

CHANNEL PROGRAMING APPARATUS

BACKGROUND OF THE INVENTION

1. Field of the Invention

The present invention relates generally to channel programming apparatus, and is directed more particularly to channel programming apparatus which is simple in construction but which can easily program or reserve desired channels.

2. Description of the Prior Art

The prior art discloses television apparatus in which a television receiver and a video tape recorder (hereinafter referred to as a VTR) are combined and two tuners are provided, so that the television receiver and VTR for the latter can record a program which is not being displayed by the former (hereinafter referred to as a hidden program).

The prior art also discloses channel programming apparatus in which a timer, which turns a power source ON and OFF, is used to reproduce a desired program on a television receiver at an appointed or reserved time. In this prior art apparatus, however, the timer is ganged with the channel selector device of a tuner, and at a time appointed or reserved by the timer the channel selector device is changed to a channel which has been selected. Thus, the prior art channel programming apparatus is complicated and expensive in construction.

OBJECTS AND SUMMARY OF THE INVENTION

Accordingly, it is an object of the present invention to provide channel programming apparatus free from the defects of the prior art.

More particularly, it is an object of this invention to provide channel programming apparatus which can record a hidden program at an appointed time without need to change the setting of a channel selector device.

Another object of this invention is to provide channel programming apparatus which utilizes two tuners and which can cause a reserved channel to be supplied to a video display at an appointed time without need to change the setting of a channel selector device.

Yet another object of this invention is to provide channel programming apparatus of simple construction utilizing two tuners which can cause a preselected channel to be recorded or displayed at an appointed time.

According to an aspect of the present invention, there is provided a channel programming apparatus capable of supplying a first video device and a second video device each with an individually tuned video signal. The apparatus has first and second video outputs for supplying signals to the first and second video devices, respectively, first and second tuner means providing first and second tuned signals, respectively; means for applying the second tuned signal to the second video output, tuner switching means for selectively applying one of the first and second tuned signals to the first video output, timing means having an unset state and being changeable to a set state in which the timing means produces a timed command at a selected time, and means for causing the tuner switching means to apply the second tuned signal to the first video output in response to the timed command.

According to another feature of the present invention, the channel programing apparatus further comprises mode switching means for selectively establishing a record command mode and a reserve command mode. In a particular embodiment of this feature, the means for causing the tuner switching means to apply the second tuned signal to the first video output in response to the timed command is rendered inoperative during the record command mode and the second video device is a video recording device. Means are provided for setting the video recording means to a recording mode in response to the timed command during the record command mode.

It is still another feature of the present invention to provide the channel programing apparatus with channel selecting means common to both the first and second tuner means and which is capable of assuming at least two states, and means for causing, when the timing means is in the unset state, both the first and the second tuned signals to correspond to the then current state of the common channel selecting means and for causing, during the set state of the timing means, the first tuned signal to correspond to the then current state of the channel selecting means and the second tuned signal to correspond to the state of the channel selecting means which existed immediately prior to the change to the set state.

The above and other objects, features and advantages of the invention will be apparent in the following detailed description of illustrative embodiments of the invention which is to be read in connection with the accompanying drawings.

BRIEF DESCRIPTION OF THE DRAWINGS

FIG. 1 is a systematic block diagram showing an embodiment of the channel programing apparatus of the present invention;

FIG. 2 is a systematic block diagram showing another embodiment of the invention; and FIGS. 3A to 3C are waveform diagrams used for explaining the embodiment of the invention shown in FIG. 2.

DESCRIPTION OF THE PREFERRED EMBODIMENTS

The present invention will be hereinbelow described with reference to the attached drawings.

Turning to FIG. 1, it will be seen that reference numeral 1 designates a first video device, in this embodiment a video display means, including a reproducing circuit 11, which comprises a circuit processing the luminance and carrier chrominance signals and a deflection circuit, and a cathode ray tube 12. A second video device 2, in this embodiment a video recording means such as a VTR, is capable of being set to one of several modes including a recording mode, and is shown associated with a tuning apparatus 3, and a timing means 4.

Tuning apparatus 3 includes an antenna 31, a distributor 32 receiving the broadcast signal from the antenna 31, and first and second tuner means. The first and second tuning means include, respectively, tuning devices 33A and 33B receiving the output signal from the distributor 32, video intermediate frequency (VIF) amplifiers 34A and 34B receiving the output signals from the tuning devices 33A and 33B, respectively, and video detecting circuits 35A and 35B supplied with the output signals from the VIF amplifiers 34A and 34B, respectively. Thus, the first and second tuner means provide a first and second tuned video signal respectively, at the output of the video detectors 35A and 35B, respectively. The timing means 4 includes a timer circuit 41 and a set switch 42. Tuner switching means, in this embodiment, a relay 5 is provided between the reproducing circuit 11 and the video detecting circuits 35A, 35B.

With the example of the invention shown in FIG. 1, usually the first tuned signal, that is, the signal selected by the first tuning device 33A and fed through the VIF amplifier 34A, and video detecting circuit 35A, is applied through the normally closed contact of the relay 5 to the first video output or connection which supplies a tuned video signal to the first video device 1. The second tuned signal, that is, the signal selected by the second tuning device 33B and fed through the VIF amplifier 34B and video detecting circuit 35B is applied to the second video output, the connection which supplies a tuned video signal to the second video device, VTR 2.

Since the first and second tuning means can select channels independently of each other, when a program of a given broadcast channel is reproduced on the cathode ray tube 12, the VTR 2 can record a hidden program, one of a broadcast channel different from that reproduced on the cathode ray tube 12.

The set switch 42 acts as a mode switching means for selectively establishing a record command mode and a reserve command mode. When the set switch 42 is positioned so that it contacts neither the contact labeled "REC" nor the contact labeled "RESERVE" in FIG. 1, the timing means is in an unset state. When set switch 42 is connected to either the "REC" of the "RESERVE" contact, the timing means produces a timing command at such contact, when the selected time to which it has been set arrives.

When it is desired that the VTR 2 record a certain program at a selected time set by the timer 4, the set switch 42 is connected to "REC" contact to establish the record command mode. In the record command mode, when the selected time arrives, the timer circuit 41 produces a predetermined voltage $E_o$. This voltage $E_o$ is applied through the "REC" contact of switch 42 to produce a timed command which in turn is applied to the VTR member 2 to make set the latter to a recording mode so that the program selected by the second tuner means is recorded in the VTR 2.

When a program is appointed or reserved, the second tuner means is set to the channel on which the program to be reserved will be broadcast. Then, the start time of the appointed program is selected by the timer 4 and the set switch 42 is made in contact with "RESERVE" contact to establish the reserve command mode. When the reserve mode has been established, relay 5 continues to apply the first tuned signal to the video display 1 until the arrival of the time selected on timer 41. When that selected time arrives, the timer circuit 41 produces the predetermined voltage $E_o$ similar to the case in which the record command has been established.

This voltage $E_o$ is applied through the "RESERVE" contact of switch 42 to produce a timed command which is applied to the magnet of relay 5 so as to make its normally open contact closed. Thus, in response to the timed command, the magnet of relay 5 causes the switching portion of relay 5 to apply second tuned signal to the video display 1. As can be seen from FIG. 1, when set switch 42 is connected to the "REC" contact, the magnet of relay 5 is rendered inoperative.

As described above, channel programming can be performed by the present invention with simple construction. There is no need for the apparatus to change the setting of any tuning devices.

In the example of the invention shown in FIG. 1, when the timer switch 42 is not set, it is so formed that it does not contact either one of both the contacts "REC" and "RESERVE" as shown in FIG. 1. The tuning devices 33A and 33B can use either a detent tuner or electronic tuning tuner.

Another example of the invention will be described with reference to FIG. 2 in which the same reference numerals are used to designate the same elements as are used in FIG. 1. In this example, electrically tunable tuning devices are used as the tuning devices 33A and 33B, and there are provided channel selecting means including a set of channel selecting push-button switches $S_1$, $S_2$, --- $S_N$ common to both the tuning devices 33A and 33B.

In the example of the invention shown in FIG. 2, 36A and 36B designate first and second channel control means which provide first and second timing control outputs corresponding to the broadcast frequency channels to be selected by the first and second tuning devices 33A and 33B, respectively. The first and second channel control means 36A and 36B have preset resistors $VA_1$, $VA_2$ --- $VA_N$ and $VB_1$, $VB_2$, --- $VB_N$ and transistors $TA_1$, $TA_2$, --- $TA_N$ and $TB_1$, $TB_2$, --- $TB_N$, respectively. Furthermore, latching means, in the form of a memory circuit 38, is provided in connection with the second channel control means 36B, and an oscillator 39 and a counter 40 are also provided.

In the example of FIG. 2, the first and second tuned signals from the video detecting circuits 35A and 35B are selectively applied through a tuner switching circuit 50 to the video display 1, while the second tuned signal from the video detecting circuit 35B is always applied to the VTR 2. This VTR 2 produces a control signal $S_C$ which will rises up to "1" when the VTR member 2 is set to the recording mode. The timer circuit 41 of the timer 4 produces a control signal $S_T$ which rises to "1" when the set switch 42 is connected with either the "REC" or the "RESERVE" contact so as to change the timer 4 to the set state.

The control signal $S_C$ from the VTR 2 and the control signal $S_T$ from the timer circuit 41 are fed through an OR circuit 51 to the memory circuit 38. This control signal $S_C$ is also applied through an OR circuit 52 to the tuner switching circuit 50 to act as the switching signal of circuit 50. The control signal $S_T$ is fed to the switching circuit 50 through a switching circuit 53, which is normally closed or ON, and through the OR circuit 52, so that it also acts as the switching signal for circuit 50.

With the apparatus of the invention constructed as above, when one of the channel selecting push button switches $S_1$, $S_2$, --- $S_N$, for example, switch $S_1$ for the selection of the channel - 1, is pushed down, a positive DC voltage obtained at a terminal 54 is applied through the closed switch $S_1$ to the oscillator 39. Thus, the oscillator 39 starts its oscillation and produces a clock pulse. This clock pulse is fed to the counter 40 which counts. The output signal therefrom is applied to a decoder 37A. When the outputs $DA_1$, $DA_2$, --- $DA_N$ from the decoder 37A, become "1", the corresponding transistors $TA_1$, $TA_2$---$TA_n$, are turned ON. In the example, when switch $S_1$ is pushed down, only the $DA_1$ output of the decoder 37A becomes "1", and thus only the transistor $TA_1$ is turned ON. When the transistor $TA_1$ becomes ON, the voltage at the terminal 54 is by-passed therethrough and hence the oscillator 38 stops its oscillation, thus keeping the transistor $TA_1$ in the ON-state. Accordingly, even if the push-button switch $S_1$ is later released the transistor $TA_1$ is kept ON. Under this state, the first channel control means 36A produces a first tuning control ouput which is set by the resistor $VA_1$ for selecting the channel - 1. This first tuning control output from the resistor $VA_1$ is applied to the variable capacitance diode provided in the local oscillator (not shown) of the tuning device 33A. From this example it can be seen that the first tuning control signal corresponds to the current state of the channel selecting means, switches $S_1$, $S_2$---$S_n$, and the channel to which the first tuned signal is tuned always corresponds to the setting of those switches.

If the VTR 2 is not in the recording mode and if the timer 4 is not in the set state, the control signals $S_C$ and $S_T$ (refer to FIGS. 3C and 3A) are both "0". Under this state, the memory circuit 38 delivers the then current output of counter 40 unchanged to decoder 37B. Thus, in our example, if only switch $S_1$ is pushed down, only one of outputs $DB_1$, $DB_2$, --- $DB_N$ i.e. output $DB_1$, from the decoder 37B is made "1" by the output from the counter 40 to thereby make the corresponding transistor $TB_1$ ON. Thus, from the second channel control means 36B there is delivered a second tuning control output, voltage $EB_1$, which is set by the resistor $VB_1$ for selecting the channel - 1, and the voltage $EB_1$ is fed to the tuning device 33B. Therefore, the second tuning device 33B tunes to the broadcast signal on the channel - 1.

Further, since the control signals $S_C$ and $S_T$ are both "0", the switching circuit 50 is switched to the condition shown in FIG. 2, i.e. to be in contact with its fixed contact B which is connected to the second tuned signal produced at the output side of the video detecting circuit 33B of the second tuned circuit. Therefore, the broadcast signal of the channel - 1 selected by the second tuner device 33B is applied through the VIF amplifier 34B, video detecting circuit 35B and the switching circuit 50 to the video display 1, and accordingly the program on channel - 1 is reproduced on the screen of the cathode ray tube 12.

In order to record the program of channel - 1 on the VTR 2 while the program of the channel - 1 is reproduced on the screen of the video display 1, the VTR must be set to the recording mode, either by the use of timer circuit 41 and switch 42 or by the use of means not shown. Thus, since the second tuned signal from the video detecting circuit 35B is applied to the VTR 2 at all times, the program of the channel - 1 is recorded on the VTR member 2. When the VTR 2 is set to the recording mode, the control signal $S_C$ therefrom becomes "1". Therefore, the switching circuit 50 is changed to a state opposite to that shown in FIG. 2, i.e., its switchable contact is connected to its fixed contact A, so that the first tuned signal, that selected by the tuner circuit 33A and fed through the VIF amplifier 34A, video detecting circuit 35A is applied by tuner switching circuit 50 to the video display 1. Thus, the picture on the screen of the cathode ray tube 12 is changed from that of the second tuned signal to that of the first tuned signal. At this time however, since the tuning device 33A is in the condition to select the channel - 1 same as the tuning device 33B, the program of the broadcast channel reproduced on the screen does not change.

Furthermore, when the control signal $S_C$ from the VTR 2 becomes "1", the memory circuit 38 memorizes the output of counter 40 which exists at this time, and that output is fixed during the interval that the VTR member 2 is in the record mode.

Thus it can be seen that the apparatus of FIG. 2 provides means for causing tuning switching circuit 50 to apply the second tuned signal to the video display before the VTR 2 is set to the recording mode, as long as timing means 4 is in the unset state, so that an operator of the apparatus can observe the tuning of the second tuning signal on display 1 before he records it on VTR 2. This reduces the probability that an improperly tuned signal will be recorded.

When the program of the broadcast channel - 1 is being recorded in the VTR 2, if, for example, the push button switch $S_4$ for selecting the channel - 4 is pushed down, the counter 40 counts up until the output $DA_4$ from the decoder 37A arrives at "1" and hence the oscillator 39 stops its oscillation. Thus, the transistor $TA_1$ becomes OFF while the transistor $TA_4$ becomes ON. Therefore, the channel control means 36A produces a first tuning control output, in the form of a voltage, which is preset by the resistor $VA_4$ to select the channel - 4. This voltage from the tuning control means 36A is fed to the tuning device 33A, so that the broadcast signal on the channel - 4 is selected and received by that tuning device. Accordingly, the broadcast signal 7 on the channel - 4 is fed through the VIF amplifier 34A, video detecting circuit 35A to produce the first tuned signal which is applied by the tuner switching circuit 50 to the reproducing circuit 11, so that the program on the channel - 4 is reproduced on the screen of the cathode ray tube 12.

In the example previously described, during the recording mode the value in memory circuit 38 is fixed and the output therefrom is equal to the output which counter 40 had while switch $S_1$ was pushed down to select the channel - 1 so that only the $DB_1$ output of decoder 37B has an output of "1". Thus, the second tuning control output delivered from the second channel control means 36B is unchanged and hence the tuning device 33B continues to receive the broadcast signal on the channel - 1. Accordingly, the VTR 2 continues to record the broadcast signal on the channel - 1. That is, a hidden program can be recorded by the VTR member 2.

Next, the use of timer 4 to make a program reservation will be described.

Firstly, a reservation time $t_1$ (refer to FIG. 3) is selected by the timer 4 and a push-button corresponding to the broadcast channel to be reserved is pushed down. Then, at a time $t_0$ (refer to FIG. 3) before the reserve time $t_1$, the timer switch 42 is connected with the contact labeled "RESERVE" in FIG. 2 to change timer 4 to the set state, and to set the apparatus to the reserve command mode. As a result the control signal $S_T$ from timer 4 to "1" at the time $t_0$ as shown in FIG. 3A. Since this control signal $S_T$ is fed to the memory circuit 38, this memory circuit 38 memorizes the output of counter 40 at that time. Also, since the control signal $S_T$ is fed to the tuner switching circuit 50, that switch's movable contact piece is switched in contact with the fixed contact A.

Accordingly, during the time that the timer 4 is in the set state and before a timed command is produced at time $t_1$, the signal selected by the first timer means is fed to the video display 1. Thus, when a desired one of the push button switches $S_1$, $S_2$, $S_N$ is pushed down, the corresponding desired program can be reproduced by the video display 1.

When the set reserve time $t_1$ arrives, the voltage $E_O$ (refer to FIG. 3B) is delivered from the timer circuit 41 and is applied as the power supply voltage to the video display 1 and to the tuning apparatus 3 (this path being not shown in FIG. 2), and also as the switching voltage to the switching circuit 53 so as to turn that switching circuit OFF.

Since at this time the control signal $S_C$ from the VTR member 2 is "0", the tuner switching circuit 50 is switched so that its movable piece contacts the fixed contact B, thus causing the tuner switching circuit 50 to apply the second tuned signal to the video display 1 in response to the timed command at time $t_1$. At this time, the second channel control means 36B produces a second tuning control output voltage to select the channel reserved by the memory circuit 38. This second tuning control output voltage is applied to the tuning device 33B and causes the second tuned signal to correspond to the state of switches $S_1$, $S_2$–$S_N$ which existed immediately prior to the setting of timer 4 to the set state. Accordingly, the program of the reserved channel is reproduced on the screen of the cathode ray tube 12. Thus, the reservation of a program is achieved.

When a program is to be recorded at a selected time, the timer circuit 41 is set to that selected time and set switch 42 is so switched that its movable piece is connected with the fixed contact labeled "REC" in FIG. 2, so as to set the apparatus to the record command mode. As a result, the tuner switching circuit 50 is so switched by the control signal $S_T$ that its movable piece is connected with the fixed contact A. Accordingly, a desired broadcast program tuned on the first tuning means can be seen on the screen of the cathode ray tube 12 even when the timer 4 is programmed to record a program on the channel tuned by the second tuning means.

When the apparatus shown in FIG. 2 is in the record command mode, switching circuit 53 remains ON, even after the production of the timed command by timer 4. As a result, tuner switching circuit 50 does not apply the second tuned signal to video display 1 in response to the timed command, but rather continues to supply the first tuned signal to that video display. When the reserve time $t_1$ arrives, the voltage $E_O$ from the timer circuit 41 is appled to the VTR 2 to set the latter to the recording mode.

When the timer 41 is changed to its unset state and the VTR 2 is set to a mode other than its recording mode, the tuner switching circuit 50 returns to its normal state i.e. the state with its movable piece is in contact with the fixed contact B.

As described above, according to the present invention a program can be reserved by apparatus of simple construction in which two tuner circuits are used. Furthermore, in the present invention a timer of simple construction, which switches the power supply ON and OFF, can be used, so that the apparatus can be made inexpensively.

Having described specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. Channel programing apparatus, capable of supplying a video display means and a video recording means which is selectively settable to one of several modes including a recording mode, each with an individual tuned video signal, comprising:

means defining first and second video outputs for supplying signals to said video display means and said video recording means, respectively;

first and second tuner means providing first and second tuned signals, respectively;

means for applying said second tuned signal to said second video output;

tuner switching means for selectively applying one of said first and said second tuned signals to said first video output;

timing means having an unset state and being changeable to a set state in which said tuning means produces a timed command at a selected time, said timing means including mode switching means for selectively establishing a record command mode and a reserve command mode;

means for causing said tuner switching means to switch over so as to apply said second tuned signal to said first video output in response to said timed command, and which is rendered inoperative in said record command mode; and means for causing said video recording means to be set to said recording mode thereof in response to said timed command when said mode switching means has established said record command mode.

2. Channel programing apparatus according to claim 1; wherein, when said mode switching means establishes said reserve mode, said tuner switching means applies said first tuned signal to said first video output until the production of said timed command.

3. A channel programing apparatus according to claim 1; further comprising channel selecting means common to both of said first and second tuner means and being capable of assuming at least two states, and means for causing, when said timing means is in said unset state, both said first and said second tuned signals to correspond to the then current state of said common channel selecting means and for causing, when said timing means is in said set state, said first tuned signal to correspond to the then current state of said channel selecting means and said second tuned signal to correspond to the state of said channel selecting means which existed immediately prior to the change to said set state.

4. Channel programing apparatus according to claim 1; further comprising means for causing, when said timing means is in said unset state, said tuning switching means to apply said second tuned signal to said first video output so long as said video recording means is in one of said modes other than recording mode.

5. Channel programing apparatus comprising:

video recording means capable of being set to one of several modes, including a recording mode;

first and second tuner circuits, providing first and second tuned signals, respectively, said second tuned signal being supplied to said video recording means to be recorded when said video recording means is in said recording mode;

channel control means for controlling the outputs of said first and second tuner circuits;

timing means having an unset state and being changeable to a set state in which said timing means produces a timed command at a selected time, including mode switching means for selectively establishing a record command mode and a reserve command mode; tuner switching means for selectively applying one of said first and second tuned signals to said video display means;

means for causing said tuner switching means to switch over so as to apply said second tuned signal to said video display means in response to said timed command; and means for causing said video recording means to be set to said recording mode in response to said timed command when said mode switching means has established said record command mode.

6. Channel programing apparatus comprising:

video recording means capable of being set to one of several modes, including a recording mode;

first and second tuner circuits, providing first and second tuned signals, respectively, said second tuned signal being supplied to said video recording means to be recorded when said video recording means is in said recording mode, and including first and second electrically tunable tuning devices, respectively;

channel control means for controlling the outputs of said first and second tuner circuits, wherein said channel control means provides a first and a second tuning control output, and said first and second electrically tunable tuning devices are tuned to a broadcast frequency channel determined by said first and second tuning control outputs, respectively;

timing means having an unset state and being changeable to a set state in which said timing means produces a timed command at a selected time;

tuner switching means for selectively applying one of said first and second tuned signals to said video display means;

means for causing said tuner switching means to switch over so as to apply said second tuned signal to said video display means in response to said timed command; and latching means for causing the second tuning control output to be fixed when said timing means is changed to said set state, whereby manual tuning of said second tuning device is inhibited when said timing means is changed to said set state.

7. Channel programing apparatus according to claim 6; further including channel selecting means capable of assuming at least two states, and means for causing, when said timing means is in said unset state, both said first and said second tuning control outputs to correspond to the then current state of said channel selecting means and for causing, in said set state of the timing means, said first tuning control output to correspond to the then current state of said channel selecting means and said second tuning control output to correspond to the state of said channel selecting means which existed immediately prior to the change to said set state.

* * * * *